United States Patent Office 3,488,377
Patented Jan. 6, 1970

3,488,377
1-(PHENYL)-1-LOWERALKYLTHIOCARBONYL-
OXY-3-UREAS
John Krenzer, Oak Park, and Sidney B. Richter, Chicago,
Ill., assignors to Velsicol Chemical Corporation, Chicago, Ill., a corporation of Delaware
No Drawing. Filed Jan. 3, 1968, Ser. No. 695,368
Int. Cl. C07c *154/00, 127/12;* A01n *9/12*
U.S. Cl. 260—455                    7 Claims

ABSTRACT OF THE DISCLOSURE

Compounds of the formula:

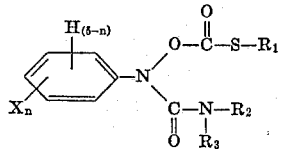

wherein each X is independently selected from the group consisting of halogen, alkyl, alkenyl, haloalkyl, nitro, alkoxy, alkylthio, alkylsulfoxide, alkylsulfone and dilower-alkylamino; $n$ is an integer from 0 to 4; $R_1$ is selected from the group consisting of alkyl, alkenyl, haloalkyl, and

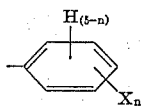

wherein X and $n$ are as heretofore described; and $R_2$ and $R_3$ are each independently selected from the group consisting of hydrogen, alkyl, alkenyl and haloalkyl. A herbicidal and fungicidal composition comprising an inert carrier and as an essential active ingredient, in a quantity toxic to weeds or fungi, a compound of the above description. A method for the control of weeds and fungi which comprises applying to said weeds or fungi a herbicidal or fungicidal composition comprising an inert carrier and, as an essential active ingredient, in a quantity toxic to weeds or fungi, a compound heretofore described.

---

This invention relates to new compositions of matter in particular this invention relates to new compounds of the formula:

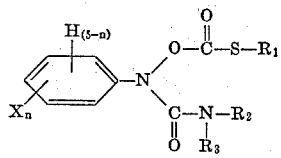

wherein each X is independently selected from the group consisting of halogen, alkyl, alkenyl, haloalkyl, nitro, alkoxy, alkylthio, alkylsulfoxide, alkylsufone and dialkylamino; $n$ is an integer from 0 to 4; $R_1$ is selected from the group consisting of alkyl, alkenyl, haloalkyl, and

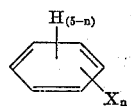

wherein X and $n$ are as heretofore described; and $R_2$ and $R_3$ are each independently selected from the group consisting of hydrogen, alkyl, alkenyl and haloalkyl.

In a preferred embodiment of this invention each X is independently selected from the group consisting of chlorine, bromine, lower alkyl, lower alkenyl, lower chloroalkyl, lower bromoalkyl, nitro, lower alkoxy, lower alkylthio, lower alkylsulfoxide, lower alkysufone and di-(lower alkyl)-amino; $n$ is an integer from 0 to 3; $R_1$ is selected from the group consisting of lower alkyl, lower alkenyl, lower haloalkyl and

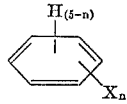

wherein X and $n$ are as described; and $R_2$ and $R_3$ are each independently selected from the group consisting of hydrogen, lower alkyl, lower alkenyl and lower haloalkyl.

The compounds of this invention are unexpectedly useful as pesticides, particularly as herbicides and fungicides.

The new compounds of the present invention can be readily prepared by reacting a hydroxyurea of the formula:

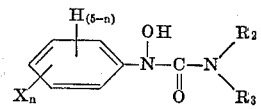

wherein X, $n$, $R_2$ and $R_3$ are as heretofore described, with a chlorothioformate of the formula:

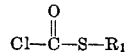

wherein $R_1$ is as heretofore described. This reaction can be readily effected by adding the described chlorothioformate to a solution of the described hydroxyurea in a suitable organic solvent, such as diethyl ether, in the presence of a base, such as a tertiary amine. This reaction can be conveniently performed at room temperature by stirring the reaction mixture for a period of from about ½ to about 8 hours. The desired product, which forms as a precipitate, can then be readily isolated by filtration or decantation and can be used as such or can further purified by washing, recrystallizing and the like.

Exemplary suitable hydroxy ureas for the purpose of this invention are 1-(3,4-dibromophenyl)-1-hydroxy-3-methylurea,
1-(3,4-dichlorophenyl)-1-hydroxy-3-ethylurea,
1-(3-methylthiophenyl)-1-hydroxy-3-methylurea,
1-(3-methylsulfonylphenyl)-1-hydroxy-3-ethylurea,
1-(4-ethylsulfinylphenyl)-1-hydroxy-3-methylurea,
1-(2-methyl-3-chlorophenyl)-1-hydroxy-3-methylurea,
1-(3-nitro-4-methylphenyl)-1-hydroxy-3-isopropylurea,
1-(3,4-dichlorophenyl)-1-hydroxy-3,3-dimethylurea,
1-(2-methoxy-4-chlorophenyl)-1-hydroxy-3-methylurea,
1-(4-trichloromethylphenyl)-1-hydroxy-3-methylurea,
1-(3-dimethylamino-4-chlorophenyl)-1-hydroxy-3-methylurea,
1-(4-allylphenyl)-1-hydroxy-3,3-diethylurea,
1-(3,4-dichlorophenyl)-1-hydroxyurea and the like.

Exemplary suitable chlorothioformates for the purpose of this invention are methyl chlorothioformate,
n-propyl chlorothioformate,
isopropyl chlorothioformate,
n-butyl chlorothioformate,
sec-butyl chlorothioformate,
t-butyl chlorothioformate,
allyl chlorothioformate,
chloromethyl chlorothioformate,
dibromomethyl chlorothioformate,
trifluoromethyl chlorothioformate,
β-chloroethyl chlorothioformate,
phenyl chlorothioformate,
4-chlorophenyl chlorothioformate,
2,4-dibromophenyl chlorothioformate,
3,4-dichlorophenyl chlorothioformate,
3-chloro-4-methylphenyl chlorothioformate, 4-methoxyphenyl chlorothioformate,
4-nitrophenyl chlorothioformate,
2-dimethylaminophenyl chlorothioformate,
4-trichloromethylphenyl chlorothioformate and the like.

The manner in which the compounds of the present invention can be prepared readily is illustrated in the following examples.

EXAMPLE 1

Preparation of 1-(3-chlorophenyl)-1-ethylthiocarbonyloxy-3-methylurea

A solution of 1-(3-chlorophenyl)-1-hydroxy-3-methylurea (10 grams; 0.05 mol) in diethyl ether (200 ml.) and trimethylamine (7 ml.) were charged into a glass reaction flask equipped with a mechanical stirrer. Ethyl chlorothioformate (6.2 grams; 0.05 mol) was then slowly added with stirring. After the addition was completed, stirring was continued for an additional period of about 2 hours during which time a precipitate was formed. After this time, the reaction mixture was filtered to recover the precipitate. The precipitate was then water washed to remove the amine hydrochloride and recrystallized from a diethyl ether-pentane mixture to yield 1-(3-chlorophenyl)-1-ethylthiocarbonyloxy-3-methylurea as a white solid having a melting point of 69° to 70° C. and having the following elemental analysis as calculated for $C_{11}H_{13}ClN_2O_3S$:

Calculated: C, 45.77%; H, 4.54%; N, 9.71%. Found: C, 46.03%; H, 4.85%; N, 9.58%.

EXAMPLE 2

Preparation of 1-(3,4-dichlorophenyl)-1-ethylthiocarbonyloxy-3-methylurea

A solution of 1-(3,4-dichlorophenyl) - 1 - hydroxy-3-methylurea (12 grams; 0.05 mol) in diethyl ether (200 ml.), and triethylamine (7 ml.) were charged into a glass reaction flask equipped with a mechanical stirrer. Ethyl chlorothioformate (6.2 grams; 0.05 mol) was then slowly added thereto. After the addition was completed stirring was continued for an additional period of about 2 hours resulting in the formation of a precipitate. After this time, the reaction mixture was filtered to recover the precipitate. The precipitate was water washed to remove the amine hydrochloride and recrystallized from a diethyl ether-pentane mixture to yield 1-(3,4-dichlorophenyl)-1-ethylthiocarbonyloxy-3-methylurea as a white solid having a melting point of 75° to 76° C. and having the following elemental analysis as calculated for $C_{11}H_{12}Cl_2N_2O_3S$:

Calculated: C, 40.89%; H, 3.75%; Cl, 21.94%. Found: C, 41.12%; H, 4.09%; Cl, 22.00%.

EXAMPLE 3

Preparation of 1-(3-methyl-4-chlorophenyl)-1-phenylthiocarbonyloxy-3-methylurea

A solution of 1-(3-methyl-4-chlorophenyl)-1-hydroxy-3-methylurea (10.7 grams; 0.05 mol) in diethyl ether (200 ml.), and triethylamine (7 ml.) are charged into a glass reaction flask equipped with a mechanical stirrer. Phenyl chlorothioformate (8 grams; 0.05 mol) is slowly added thereto. After the addition is completed stirring is continued for an additional period of about 3 hours, resulting in the formation of a precipitate. The precipitate is then recovered by filtration and water washed to yield 1-(3-methyl-4-chlorophenyl)-1 - phenylthiocarbonyloxy-3-methylurea.

EXAMPLE 4

Preparation of 1-(4-nitrophenyl)-1-isopropylthiocarbonyloxy-3,3-dimethylurea

A solution of 1-(4-nitrophenyl)-1-hydroxy-3,3-dimethylurea (22.5 grams; 0.1 mol) in diethyl ether (300 ml.), and triethylamine (14 ml.) are charged into a glass reaction flask equipped with a mechanical stirrer. Isopropyl chlorothioformate (14 grams; 0.1 mol) is then slowly added thereto. After the addition is completed stirring is continued for an additional period of about 3 hours, resulting in the formation of a precipitate. The precipitate is then recovered by filtration, water washed, and dried under vacuum to yield 1-(4-nitrophenyl)-1-isopropylthiocarbonyloxy-3,3-dimethylurea.

Other compounds within the scope of this invention can be prepared by the procedures described in the foregoing examples. Presented in the following examples are the essential starting materials to prepare the indicated named compounds according to the procedures heretofore described.

EXAMPLE 5

1 - (3,4 - dibromophenyl) - 1 - hydroxy - 3 - methylurea +phenyl chlorothioformate=1-(3,4-dibromophenyl)-1-phenylthiocarbonyloxy-3-methylurea.

EXAMPLE 6

1 - (2 - methoxyphenyl) - 1 - hydroxy-3,3-dimethylurea +methyl chlorothioformate=1 - (2 - methoxyphenyl)-1-methylthiocarbonyloxy-3,3-dimethylurea.

EXAMPLE 7

1 - (3 - dimethylaminophenyl)-1-hydroxy-3-methylurea +ethyl chlorothioformate=1-(3-dimethylaminophenyl)-1-ethylthiocarbonyloxy-3-methylurea.

EXAMPLE 8

1 - (4 - trichloromethyl) - 1 - hydroxy-3-methylurea+4-chlorophenyl chlorothioformate=1-(4-trichlorophenyl)-1-(4-chlorophenylthiocarbonyloxy)-3-methylurea.

EXAMPLE 9

1 - (3 - methyl - 4,5-dichlorophenyl)-1-hydroxy-3-allylurea+methyl chlorothioformate=1-(3-methyl-4,5-dichlorophenyl)-1-methylthiocarbonyloxy-3-allylurea.

EXAMPLE 10

1-(2,4 - dimethylphenyl) - 1 - hydroxy - 3 - methylurea +3-methyl-5-chlorophenyl chlorothioformate=1-(2,4-dimethylphenyl) - 1-(3-methyl-5-chlorophenylthiocarbonyloxy)-3-methylurea.

EXAMPLE 11

1 - phenyl - 1 - hydroxy - 3 - methylurea+3,4-dichlorophenyl chlorothioformate=1-phenyl-1-(3,4-dichlorophenylthiocarbonyloxy)-3-methylurea.

EXAMPLE 12

1 - (4 - bromophenyl)-1-hydroxy-3-methylurea+2,4-dinitrophenyl chlorothioformate=1-(4-bromophenyl)-1-(2,4-dinitrophenylthiocarbonyloxy)-3-methylurea.

EXAMPLE 13

1 - (3 - chlorophenyl) - 1 - hydroxy-3-chloromethylurea +2-methoxyphenyl chlorothioformate=1-(3-chlorophenyl) - 1 - (2 - methoxyphenylthiocarbonyloxy) - 3 - chloromethylurea.

EXAMPLE 14

1 - (2 - dimethylamino - 5 - chlorophenyl)-1-hydroxy-3-methylurea+2-chloro-4-methylphenyl chlorothioformate =1 - (2 - dimethylamino - 5 - chlorophenyl)-1-(2-chloro-4-methylphenylthiocarbonyloxy)-3-methylurea.

EXAMPLE 15

1 - (3 - methylthiophenyl) - 1 - hydroxy - 3-methylurea +methyl chlorothioformate=1-(3-methylthiophenyl)-1-methylthiocarbonyloxy-3-methylurea.

EXAMPLE 16

1 - (3 - methylsulfonylphenyl) - 1 - hydroxy-3-ethylurea +isopropyl chlorothioformate=1-(3-methylsulfonylphenyl)-1-isopropylthiocarbonyloxy-3-ethylurea.

EXAMPLE 17

1 - (4 - ethylsulfinylphenyl) - 1 - hydroxyurea-3-methylurea + methyl chlorothioformate = 1-(4-ethylsulfinylphenyl)-1-methylthiocarbonyloxy-3-methylurea.

For practical use as pesticides, the compounds of this invention are generally incorporated into pesticidal compositions which comprise an inert carrier and a pesticidally toxic amount of such a compound. Such pesticidal compositions, which can also be called formulations, enable the active compound to be applied conveniently to the site of the pest infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficently soluble in common organic solvents such as kerosene or xylene so that they can be used directly as solutions in these solvents. Frequently, solutions of pesticides can be dispersed under superatmospheric pressure as aerosols. However, preferred liquid pesticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the pest infestation. The emulsifiers most commonly used in these concentrates are nonionic or mixtures of nonionic with anionic surface-active agents. With the use of some emulsifier systems an inverted emulsion (water-in-oil) can be prepared for direct application to pest infestations.

A typical pesticidal composition according to this invention is illustrated by the following example, in which the quantities are in parts by weight.

EXAMPLE 18

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation. For the purpose of this invention the term pesticide is used to designate herbicide or fungicide.

When used as herbicides the compounds this invention can be applied in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers; spreaders; deactivators; adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5 to about 95 percent of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4–D, 2,4,5–T, MCPA, MCPB, 4(2,4–DB), 2,4-DEB, 4–CPB, 4–CPA, 4–CPP, 2,4,5-TB, 2,4,5–TES, 3,4–DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4 - (chloroacetyl) morpholine, 1 - (chloroacetyl) piperidine, and the like; chlorinated aliphatic acid herbicides such as TCA, dalapon, 2,3-di-chloropropionic acid, 2,2,3–TPA and the like, chlorinated benzoic acid and phenylacetic acid herbicides such as 2,3,6–TBA, 2,3,5,6–TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro - 3 - nitrobenozic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluralin, solan, dicryl, merphos, DMPA, o-S-dimethyl tetrachlorothioterephthalate, methyl 2,3,5,6 - tetrachloro - N - methoxy-N-methyl-terephthalamate, 2 - [(4-chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, bromnil, CP–50144, H–176–1, H–732, M–2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, filed pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein, and purple star thistle; or or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of crabgrass, dock and mustard weed. In these experiments small plastic greenhouse pots filled with dry soil were seeded with crabgrass, dock and mustard weed seeds. Twenty-four hours or less after seeding the pots were sprayed with water until the soil was wet and the test compounds formulated as aqueous emulsions of acetone solutions containing emulsifiers were sprayed at a concentration of 8 pounds per acre on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1, 2=slight injury, 3, 4=moderate injury, 5, 6=moderately severe injury, 7, 8, 9=severe injury and 10=death. In this experiment the compound 1-(3-chlorophenyl)-1-ethylthiocarbonyloxy-3-methylurea was rated at 9 for the control of crabgrass and at 10 for the control of both dock and mustard weed; and the compound 1-(3,4-dichlorophenyl) - 1-ethylthiocarbonyloxy-3-methylurea was rated at 10 for the control of mustard weed.

The herbicidal activity of the compounds of this invention was also demonstrated by experiments carried out for the post-emergence control of California barnyard grass, foxtail, mustard weed, pigweed and velvet leaf. In these experiments the compounds to be tested were formulated as aqueous emulsions and sprayed at the indicated dosage on the foliage of California barnyard grass, foxtail, mustard weed, pigweed and velvet leaf plants that had attained at prescribed size. After spraying the plants were placed in a greenhouse and watered daily or mose frequently. Water was not applied to the foliage of the treated plants. The severity of the injury was determined 10 to 15 days after treatment and was rated on the scale of from 0 to 10 heretofore described. In this experiment the compound 1-(3-chlorophenyl)-1-ethylthiocarbonyloxy-3-methylurea was rated at 8 for the control of California barnyard grass, and at 10 for the control of mustard weed and velvet leaf; and the compound 1 - (3,4-dichlorophenyl)-1-ethylthiocarbonyloxy-3-methyl-urea was rated at 8 for the control of California barnyard grass, at 9 for foxtail, and at 10 for mustard weed, pigweed and velvet leaf.

The new compounds of this invention are fungicidal in their ability to kill, inhibit, or inactivate a fungus so that it does not grow. Practically, these compounds can be used to prevent fungi and molds from harming cloth, wood, plants, seeds, fruit, animals, or whatever else they attack. The fungicidal compound should preferably be applied before the infection has occurred and certainly before it has progressed very far.

When used as fungicides the compounds of this invention can be applied in any manner recognized by the art. The concentration of the new compounds of this invention is the fungicidal compositions will vary greatly with the type of formulation and the purpose for which it is designed, but generally the fungicidal compositions will comprise from about 0.05 to about 95 percent by weight of the active compounds of this invention. In a preferred embodiment of this invention, the fungicidal compositions will comprise from about 5 to 75 percent by weight of the active compound. The compositons can also comprise such additional substances as other pesticides, spreaders, adhesives, stickers, fertilizers, activators, synergists, and the like.

The compounds of the present invention are also useful when combined with other fungicides in the fungicidal compositions heretofore described. The other fungicides can comprise from about 5 to about 95 percent of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-amino-butane, bordeaux mixture, ammonium dimethyl dithiocarbamate, benzoyl trimethyl ammonium bromide, cadmium sulfate, captan, chloranil, copper sulfate, cycloheximide, dichlone, 2,4-dichloro - 6 - (2-chloroanilino)-s-triazine, DDT, dichlone, dichloran, p-dimethylaminobenzenediazo sodium sulfonate, dinocap, diphenylmercuri, 8 - hydroxyquinolinate, dodine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides, and other derivatives whenever applicable to the particular parent compounds.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The fungicidal utility of the compounds of this invention was illustrated by experiments carried out for the control of leaf rust on wheat, *Puccinia rubigo-vera*. In these experiments wheat plants were grown in soil until they were about 2 to 2½ inches tall. The soil in which the plants were growing was then watered with about 25 cc. of a solution of the chemical in water. The plants were then placed in the greenhouse for about five days and inoculated with leaf rust spores by dusting the spores from diseased plants. After seven to ten days the growth of the fungus on the plants were measured and rated in comparison with plants inoculated but otherwise untreated. The results of these experiments are presented below.

TABLE 1

| Test Compound | Concn. actual compound, p.p.m. | Percent control |
|---|---|---|
| Product of Example 1 | 1,000 | 95 |
| Product of Example 2 | 1,000 | 95 |

We claim:
1. A compound of the formula

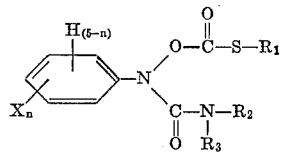

wherein each X is independently selected from the group consisting of chlorine, lower alkyl, bromine alkenyl, lower chloroloweralkyl haloalkyl, nitro, lower alkoxy, lower alkylthio, alkylsulfoxide, lower alkylsulfone, and dialkylamino; $n$ is an integer from 0 to 4; $R_1$ is selected from the group consisting of lower alkyl, lower alkenyl, chloroloweralkyl haloalkyl, and

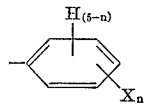

wherein X and $n$ have the same meaning as above; and $R_2$ and $R_3$ are each independenty selected from the group consisting of hydrogen, lower alkyl, lower alkenyl, and chloroloweralkyl haloalkyl.

2. The compound of caim 1, 1 - (3 - chlorophenyl)-1-methylthiocarbonyloxy-3-methylurea.

3. The compound of claim 1, 1-(3-chlorophenyl)-1-ethylthiocarbonyloxy-2-methylurea.

4. The compound of claim 1, 1-(3,4-dichlorophenyl)-1-methylthiocarbonyloxy-3-methylurea.

5. The compound of claim 1, 1-(3,4-dichlorophenyl)-1-ethylthiocarbonyloxy-3-methylurea.

6. The compound of claim 1, 1-(3,4-dichlorophenyl)-1-phenylthiocarbonyloxy-3-methylurea.

7. The compound of claim 1, 1-(3-chloro - 4 - methylphenyl)-1-methylthiocarbonyloxy-3,3-dimethylurea.

References Cited

UNITED STATES PATENTS 3,280,162  10/1966  Gaul _____ 260—455

CHARLES B. PARKER, Primary Examiner

D. R. PHILLIPS, Assistant Examiner

U.S. Cl. X.R.

71—100; 424—301

UNITED STATES PATENT OFFICE
CERTIFICATE OF CORRECTION

Patent No. 3,488,377                                        January 6, 1970

John Krenzer et al.

It is certified that error appears in the above identified patent and that said Letters Patent are hereby corrected as shown below:

Column 2, line 35, after "can", second occurrence, insert -- be --. Column 5, line 58, after "compounds" insert -- of --. Column 7, line 69, "at" should read -- a --;     line 71, "mose" should read -- more --. Column 8, line 19, "is" should read -- in --. Column 10, lines 1 to 6, that portion of claim 1 should read -- consisting of chlorine, bromine, lower alkyl, lower alkenyl, chloroloweralkyl, nitro, lower alkoxy, lower alkylthio, alkylsulfoxide, lower alkylsulfone, and dialkylamino; n is an integer from 0 to 4; $R_1$ is selected from the group consisting of lower alkyl, lower alkenyl, chloroloweralkyl, and --; line 17, cancel "haloalkyl"; line 21, "2" should read -- 3 --.

Signed and sealed this 1st day of September 1970.

(SEAL)
Attest:

EDWARD M. FLETCHER, JR.                      WILLIAM E. SCHUYLER, JR.
Attesting Officer                                 Commissioner of Patents